(12) United States Patent
Zhou

(10) Patent No.: US 10,219,320 B2
(45) Date of Patent: Feb. 26, 2019

(54) METHODS AND SYSTEMS FOR ADDING A DEVICE TO A SEQUENTIAL PERSONAL AREA NETWORK CHAIN

(71) Applicant: MOTOROLA SOLUTIONS, INC., Chicago, IL (US)

(72) Inventor: Yu Zhou, SiChuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/566,803

(22) PCT Filed: Aug. 19, 2016

(86) PCT No.: PCT/CN2016/096064
§ 371 (c)(1),
(2) Date: Oct. 16, 2017

(87) PCT Pub. No.: WO2018/032507
PCT Pub. Date: Feb. 22, 2018

(65) Prior Publication Data
US 2018/0343702 A1    Nov. 29, 2018

(51) Int. Cl.
*H04W 4/80*  (2018.01)
*H04W 84/18*  (2009.01)
(Continued)

(52) U.S. Cl.
CPC ............. *H04W 84/18* (2013.01); *H04L 67/12* (2013.01); *H04L 67/18* (2013.01); *H04W 4/80* (2018.02);
(Continued)

(58) Field of Classification Search
CPC ........... H04W 4/04; H04W 4/30; H04W 4/38; H04W 4/80; H04W 84/18; H04W 76/11;
(Continued)

(56) References Cited

U.S. PATENT DOCUMENTS

| 7,471,665 B2* | 12/2008 | Perlman | H04L 63/0428 370/338 |
| 2016/0134436 A1* | 5/2016 | Yu | H04W 52/0212 370/337 |
| 2018/0220482 A1* | 8/2018 | Kuang | H04W 76/15 |

FOREIGN PATENT DOCUMENTS

| CN | 101902772 | 12/2010 |
| CN | 102083183 | 6/2011 |

(Continued)

OTHER PUBLICATIONS

Machine translation of CN-107040878-A (Year: 2017).*

(Continued)

*Primary Examiner* — Paul H Masur
(74) *Attorney, Agent, or Firm* — Michael Best & Friedrich LLP

(57) ABSTRACT

Methods and systems for adding a device to a sequential personal area network chain (100) having a hierarchy of transmission intervals. The method includes detecting a new device (120D) to be added in the sequential personal area network chain (100) and determining an expected transmission interval for the new device (120D). The method also includes determining a position at which to insert the new device (120D) within the sequential personal area network chain (100) based on the expected transmission interval of the new device (120D) and the hierarchy of transmission intervals across the two or more devices (120A, 120B, 120C) already in the sequential personal area network chain (100). The method further includes causing the new device (120D) to be inserted into the sequential personal area network chain (100) at the determined position.

20 Claims, 6 Drawing Sheets

(51) Int. Cl.
  *H04W 76/11* (2018.01)
  *H04W 8/00* (2009.01)
  *H04W 64/00* (2009.01)
  *H04L 29/08* (2006.01)
  *H04W 84/12* (2009.01)

(52) U.S. Cl.
  CPC ......... *H04W 8/005* (2013.01); *H04W 64/003* (2013.01); *H04W 76/11* (2018.02); *H04W 84/12* (2013.01)

(58) Field of Classification Search
  CPC .... H04W 8/005; H04W 64/003; H04L 67/12; H04L 67/18
  See application file for complete search history.

(56) References Cited

FOREIGN PATENT DOCUMENTS

| | | | |
|---|---|---|---|
| CN | 103517457 | | 1/2014 |
| CN | 104283969 | | 1/2015 |
| CN | 104469790 A | * | 3/2015 |
| CN | 107040878 A | * | 8/2017 |
| EP | 2582182 | | 4/2013 |
| WO | 2008100078 | | 8/2008 |

OTHER PUBLICATIONS

Machine translation of CN-104469790-A (Year: 2015).*
Bian et al., "Study on a Cluster-Chain Routing Protocol in Wireless Sensor Networks," article (2008) IEEE, 5 pages.
Fasolo et al., "In-Network Aggregation Techniques for Wireless Sensor Networks: A Survey," article (2007) IEEE, pp. 70-87.
Lindsey et al., "Data Gathering Algorithms in Sensor Networks Using Energy Metrics," article (2002) IEEE, vol. 13, No. 9, pp. 924-935.
Mamun, "A Qualitative Comparison of Different Logical Topologies for Wireless Sensor Networks," article (2012) ISSN 1424-8220, 12, pp. 14887-14913; doi:10.3390/s121114887, www.mdpi.com/journal/sensors.
Min et al., "Energy-Efficient Data Aggregation Protocol for Location-Aware Wireless Sensor Networks," articel (2008) International Symposium on Parallel and Distributed Processing with Applications, pp. 751-756.
Ray et al., "Data Aggregation Techniques in Wireless Sensor Network: A Survey," article (2012) ISSN: 2277-5668, vol. 1, No. 2, pp. 81-92.
PCT/CN2016/096064 International Search Report and Written Opinion of the International Searching Authority dated Apr. 27, 2017 (8 pages).

* cited by examiner

METHODS AND SYSTEMS FOR ADDING A DEVICE TO A SEQUENTIAL PERSONAL AREA NETWORK CHAIN

BACKGROUND OF THE INVENTION

Public safety personnel may be equipped with multiple sensors that detect the personnel's surroundings and body status. For example, a first responder may be equipped with a holster sensor detecting whether an instrument is positioned in the holster, a blood pressure sensor detecting the first responder's blood pressure, and a temperature sensor detecting the first responder's body temperature. These sensors may transmit data to the first responder's radio, which collects and processes the data.

The sensors and the radio may form a personal area network, and the sensors may communicate with the radio using a wireless communication protocol. Depending on the communication protocol used by the sensors and the radio, the number of simultaneous connections between the radio and the sensors may be limited. Therefore, in some situations, the radio may not timely receive data from a particular sensor. Also, in situations where the radio polls each sensor for data, the radio may waste power and air time polling a sensor for data when a sensor does not have data for the radio.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
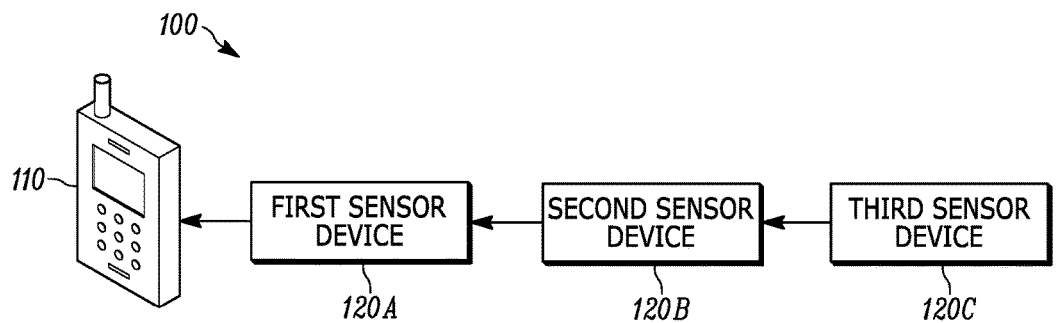
FIG. 1 is a diagram of a sequential personal area network chain in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of adding a device to a sequential personal area network chain. The method includes detecting, with an electronic processor, a new device to be added in the sequential personal area network chain and determining, with the electronic processor, an expected transmission interval for the new device. The method also includes determining, with the electronic processor, a position at which to insert the new device within the sequential personal area network chain based on the expected transmission interval of the new device and a hierarchy of transmission intervals across two or more devices already in the sequential personal area network chain, the sequential personal area network chain including a target device at a first end of the sequential personal area network chain opposite a second end of the sequential personal area network chain, the position of the new device preceding the target device in the sequential personal area network chain in a direction from the second end to the first end. The method further includes causing, with the electronic processor, the new device to be inserted into the sequential personal area network chain at the determined position.

Another embodiment provides a communications device including an electronic processor. The electronic processor is configured to detect a new device to be added in a sequential personal area network chain, the sequential personal area network chain having a hierarchy of transmission intervals across two or more devices already in the sequential personal area network chain including the communications device at a first end of the sequential personal area network chain opposite a second end of the sequential personal area network chain. The electronic processor is also configured to determine an expected transmission interval for the new device and determine a position at which to insert the new device within the sequential personal area network chain based on the expected transmission interval of the new device and the hierarchy of transmission intervals across the two or more devices already in the sequential personal area network chain, the position of the new device preceding the communications device in the sequential personal area network chain in a direction from the second end to the first end. The electronic processor is further configured to cause the new device to be inserted into the sequential personal area network chain at the determined position Another embodiment provides a system for forming a sequential personal area network chain. The system includes a new sensor and a target device communicating with the new sensor over a wireless personal area network. The target device includes an electronic processor configured to detect the new sensor to be added in the sequential personal area network chain and determine an expected transmission interval for the new sensor. The electronic processor is also configured to determine a position at which to insert the new sensor within the sequential personal area network chain based on the expected transmission interval of the new sensor and a hierarchy of transmission intervals across two or more sensors already in the sequential personal area network chain, the sequential personal area network chain including the target device at a first end of the sequential personal area network chain opposite a second end of the sequential personal area network chain, the position of the new sensor preceding the target device in the sequential personal area network chain in a direction from the second end to the first end. The electronic processor is further configured to cause the new sensor to be inserted into the sequential personal area network chain at the determined position.

FIG. 1 is a diagram of an example sequential personal area network chain 100. In the example illustrated, the sequential personal area network chain 100 includes a mobile communications device 110 and a plurality of sensor devices 120 (for example, a first sensor device 120A, a second sensor device 120B, and a third sensor device 120C). The mobile communications device 110 may be, for example, a mobile two-way radio, a smart telephone, or other similar device. The sensor devices 120 may include, for example, a holster sensor, a blood pressure sensor, a temperature sensor, an orientation sensor, a movement sensor, a gas sensor, or other similar devices. FIG. 1 illustrates one exemplary embodiment of a sequential personal area network chain 100. In other embodiments, the sequential personal area network chain 100 may include more or fewer components.

The mobile communications device 110 and the sensor devices 120 communicate in a sequential fashion via wireless signals. In some embodiments, the mobile communications device 110 and the sensor devices 120 communicate via radio frequency signals using the Bluetooth® protocol, Bluetooth® Low-Energy (LE) protocol, Wi-Fi™, and the like. The sensor devices 120 transmit sensor data at certain intervals known as transmission intervals. Each sensor device 120 may have a different transmission interval. As described in more detail below, the sensor devices 120 are arranged in the sequential personal area network chain 100 based on their transmission intervals.

The mobile communications device 110 (also referred to as a target device) forms a first end of the sequential personal area network chain 100. The third sensor device 120C forms a second end of the sequential personal area network chain 100. The sensor devices 120 are arranged from the second end to the first end (the mobile communications device 110) in descending order of transmission intervals. That is, a sensor device 120 having a larger transmission interval is arranged closer to the second end of the sequential personal area network chain 100, whereas a sensor device 120 having a smaller transmission interval is arranged closer to the first end of the sequential personal area network chain 100. As a result, the sequential personal area network chain 100 has a hierarchy of transmission intervals across the plurality of sensor devices 120.

Each preceding sensor device 120 in the direction from the second end to the first end of the sequential personal area network chain 100 transmits data to the succeeding sensor device 120 in the sequential personal area network chain 100 after each preceding sensor device's 120 transmission interval. The sensor device 120 immediately preceding the mobile communications device 110 in the direction from the second end to the first end of the sequential personal area network chain 100 transmits data to the mobile communications device 110. For example, assume the third sensor device 120C has a transmission interval of 4 seconds, the second sensor device 120B has a transmission interval of 1 second, and the first sensor device 120A has a transmission interval of 500 milliseconds. The third sensor device 120C transmits sensor data of the third sensor device 120C to the second sensor device 120B every 4 seconds. The second sensor device 120B transmits sensor data of the second sensor device 120B in addition to the last received sensor data of the third sensor device 120C (received from the third sensor device 120C) to the first sensor device 120A every 1 second. Similarly, the first sensor device 120A transmits sensor data of the first sensor device 120A in addition to the last received sensor data of the second sensor device 120B and the last received sensor data of the third sensor device 120C (received from the second sensor device 120B) to the mobile communications device 110 every 500 milliseconds.

The mobile communications device 110 receives sensor data of the sensor devices 120 in the sequential personal area network chain 100 from the immediately preceding sensor device 120 in the sequential personal area network chain 100 in the direction from the second end to the first end. In some embodiments, the first sensor device 120A is in a transmitting role with the mobile communications device 110 in a receiving role. As a consequence, the first sensor device 120A transmits the sensor data to the mobile communications device 110 without the need for the mobile communications device 110 polling for the sensor data. Similarly, the first sensor device 120A is in a receiving role with the second sensor device 120B in a transmitting role and the second sensor device 120B is in a receiving role with the third sensor device 120C in a transmitting role. That is, each preceding sensor device 120 in the direction from the second end to the first end of the sequential personal area network chain 100 is in transmitting role with each succeeding sensor device 120. As a consequence, the sensor devices 120 transmit sensor data automatically to the succeeding device in the sequential personal area network chain 100 at the transmission interval without the need for polling, which may reduce the power usage of each device in the sequential personal area network chain 100. In other embodiments, a master-slave connection may similarly be used in place of a transmitting-receiving connection as described above.

Figure 2:
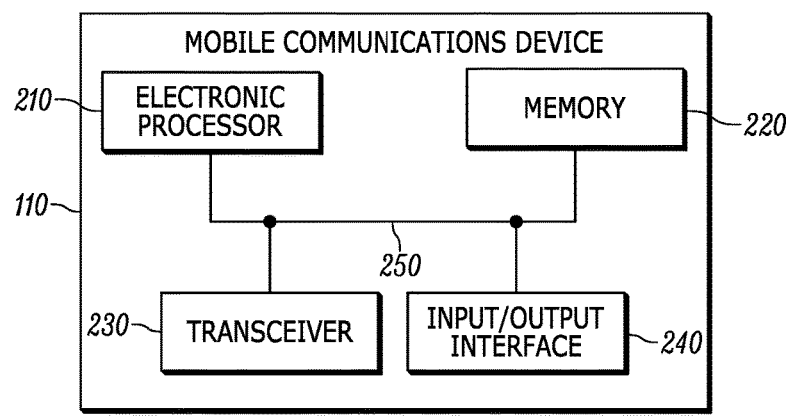
FIG. 2 is a diagram of a target device in accordance with some embodiments.

FIG. 2 is a diagram of one embodiment of the mobile communications device 110. In the example illustrated, the mobile communications device 110 includes an electronic processor 210, a memory 220, a transceiver 230, and an input/output interface 240. The electronic processor 210, the memory 220, the transceiver 230, and the input/output interface 240 communicate over one or more wired or wireless connections (for example, a communication bus 250). FIG. 2 illustrates only one exemplary embodiment of the mobile communications device 110. In other embodiments, the mobile communications device 110 may include more or fewer components and may perform functions that are not explicitly described herein.

In some embodiments, the electronic processor 210 is implemented as a microprocessor with separate memory, such as the memory 220. In other embodiments, the electronic processor 210 is implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), an application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the mobile communications device 110 described herein. The memory 220 may include, for example, a program storage area and a data storage area. The program storage area and the data storage area may include combinations of different types of memory, such as a read-only memory and random-access memory.

The transceiver 230 enables wireless communication from the mobile communications device 110 to, for example, the sensor devices 120 that are within a personal area network of the mobile communications device 110. In other embodiments, rather than the transceiver 230, the mobile communications device 110 may include separate transmitting and receiving components, for example, a transmitter and a receiver. As described above, in some embodiments, the mobile communications device 110 may be in a receiving role to one of the sensor devices 120.

Figure 3:
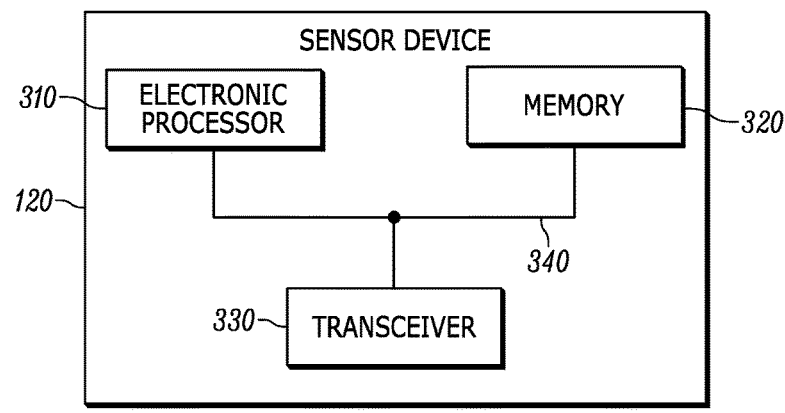
FIG. 3 is a diagram of a sensor device in accordance with some embodiments.

The input/output interface 240 may include one or more input mechanisms (for example, a touch pad, a button, a touchscreen, a knob, and the like), one or more output mechanisms (for example, a display, a speaker, a touchscreen, light emitting diodes (LEDs), and the like), or a combination thereof FIG. 3 is a diagram of one embodiment of the sensor device 120. In the example illustrated, the sensor device 120 includes a sensor electronic processor 310, a sensor memory 320, and a sensor transceiver 330. The sensor electronic processor 310, the sensor memory 320, and the sensor transceiver 330 communicate over one or more wired or wireless connections (for example, a sensor communication bus 350). FIG. 3 illustrates only one exemplary embodiment of the sensor device 120. The sensor device 120 may include more or fewer components and may perform functions other than those explicitly described herein.

The sensor electronic processor 310 may be implemented in various ways including ways that are similar to those described above with respect to the electronic processor 210. Likewise, the sensor memory 320 may be implemented in various ways including ways that are similar to those described with respect to the memory 220. The sensor memory 320 may store instructions that are received and executed by the sensor electronic processor 310 to carry out functionality described herein.

The sensor transceiver 330 enables wireless communication for the sensor device 120, for example, with the mobile communications device 110 and/or other sensor devices 120. In other embodiments, rather than a sensor transceiver 330, the sensor device 120 may include separate transmitting and receiving components, for example, a transmitter and a receiver.

Figure 4:
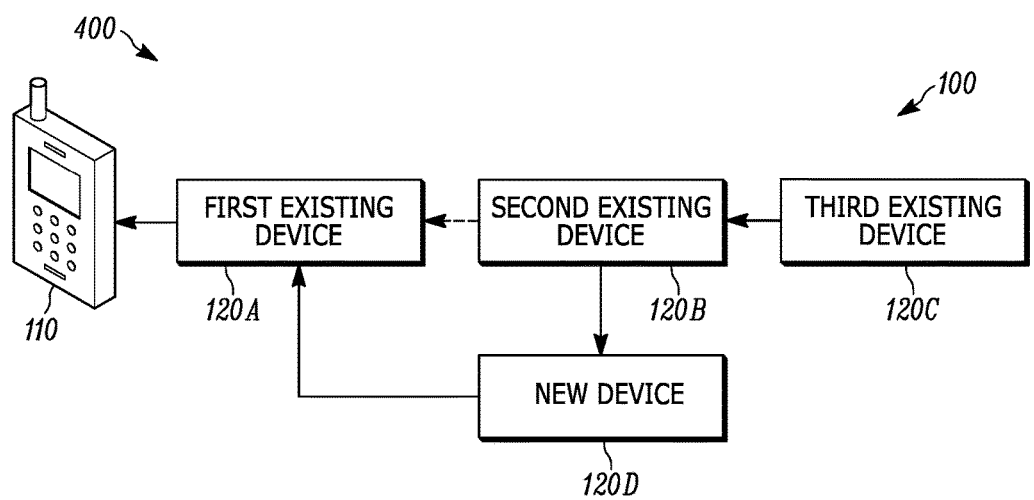
FIG. 4 is a diagram of a system for forming a sequential personal area network in accordance with some embodiments.

FIG. 4 is a diagram of a system 400 for adding a device to the sequential personal area network chain 100. In the example illustrated, the system 400 includes the sequential personal area network chain 100 and a new sensor device 120D ("new" to the sequential personal area network chain 100). As explained in detail below with respect to FIG. 5, the mobile communications device 110 adds the new sensor device 120D between the second sensor device 120B and the first sensor device 120A based on comparing the transmission interval of the new sensor device 120D with the transmission intervals of the existing sensor devices 120 in the sequential personal area network chain 100.

Figure 5:
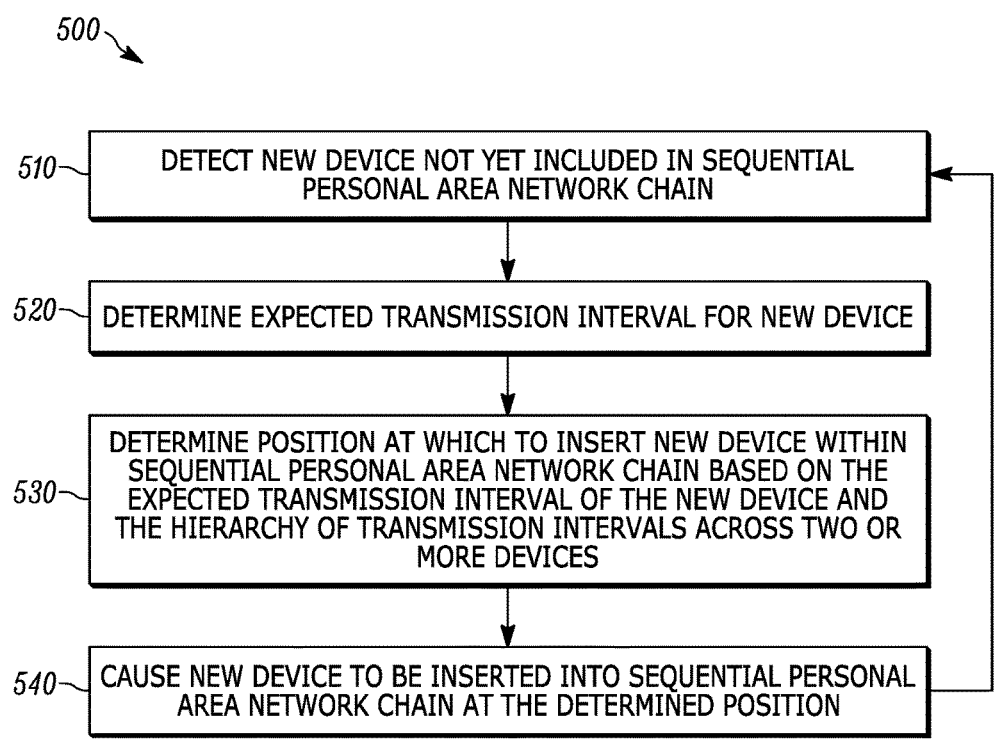
FIG. 5 is a flowchart of a method of forming a sequential personal area network in accordance with some embodiments.

FIG. 5 is a flowchart illustrating one example method 500 for adding a device to the sequential personal area network chain 100. As illustrated in FIG. 5, the method 500 includes detecting, with the electronic processor 210, the new sensor device 120D to be added in the sequential personal area network chain 100 (at block 510). In some embodiments, the new sensor device 120D transmits a beacon when, for example, a user requests the new sensor device 120D to be added to the sequential personal area network chain 100 or when the new sensor device 120D is powered on. The beacon transmitted by the new sensor device 120D may include identification information of the new sensor device 120D, a transmission interval of the new sensor device 120D, and the like. Accordingly, in some embodiments, the mobile communications device 110 detects the new sensor device 120D by detecting the beacon transmitted by the new sensor device 120D via the transceiver 230.

The mobile communications device 110 determines, using the electronic processor 210, the expected transmission interval of the new sensor device 120D (at block 520). As described above, the new sensor device 120D may transmit a beacon including information about the transmission interval of the new sensor device 120D. Accordingly, in some embodiments, the mobile communications device 110 determines the expected transmission interval of the new sensor device 120D based on the beacon transmitted by the new sensor device 120D. In other embodiments, the mobile communications device 110 determines the expected transmission interval of the new sensor device 120D by querying the new sensor device 120D for a transmission interval, accessing a look-up table mapping transmission intervals to particular models, types, or identifiers of sensor devices (for example, stored in the memory 220).

As illustrated in FIG. 5, the mobile communications device 110 determines, using the electronic processor 210, a position at which to insert the new sensor device 120D within the sequential personal area network chain 100 based on the expected transmission interval of the new sensor device 120D and the hierarchy of transmission intervals across the plurality of sensor devices 120 (at block 530). In particular, the mobile communications device 110 may compare the transmission interval of the new sensor device 120D with the transmission interval of each of the existing sensor devices 120 already included in the sequential personal area network chain 100). Using the example in FIG. 1, assume that the transmission interval of the new sensor device 120D is 750 milliseconds. Accordingly, using these example transmission intervals, the mobile communications device 110 determines that the transmission interval of the new sensor device 120D exceeds the transmission interval of the first sensor device 120A (having a second transmission interval of 500 milliseconds) but does not exceed the transmission interval of the second sensor device 120B (having a third transmission interval of 1 second). Therefore, the mobile communications device 110 determines that the new sensor device 120D may be inserted between the first sensor device 120A and the second sensor device 120B. In other words, the mobile communications device 110 identifies the first sensor device 120A (for example, existing device or existing sensor) as succeeding the new sensor device 120D and identifies the second sensor device 120B (for example, second existing device or second existing sensor) as preceding the new sensor device 120D in the direction from the second end to the first end of the sequential personal area network chain 100.

After identifying a position for the new sensor device 120D, the mobile communications device 110 causes, using the electronic processor 210, the new sensor device 120D to be inserted into the sequential personal area network chain 100 at the determined position (at block 540). In some embodiments, as described in more detail below with respect to FIG. 6, the mobile communications device 110 instructs the new sensor device 120D to connect in a transmitting role to the succeeding sensor device 120 (for example, first sensor device 120A) from the determined position. The mobile communications device 110 also instructs the preceding device (for example, second sensor device 120B) from the determined position to disconnect with the succeeding sensor device 120 (that is, first sensor device 120A) and connect to the new sensor device 120D in a transmitting role.

In some situations, the new sensor device 120D may have a substantially similar transmission interval as an existing sensor device 120 included in the sequential personal area network chain 100. In these situations, the new sensor device 120D may be added to the sequential personal area network chain 100 in a position preceding the position of existing sensor device having substantially similar transmission interval. For example, considering the above example, assume the new sensor device 120D has a transmission interval of 500 milliseconds similar to the transmission interval of the first sensor device 120A. In this situation, the new sensor device 120D may be added to the sequential personal area network chain 100 in a position preceding the first sensor device 120A.

Figure 6:
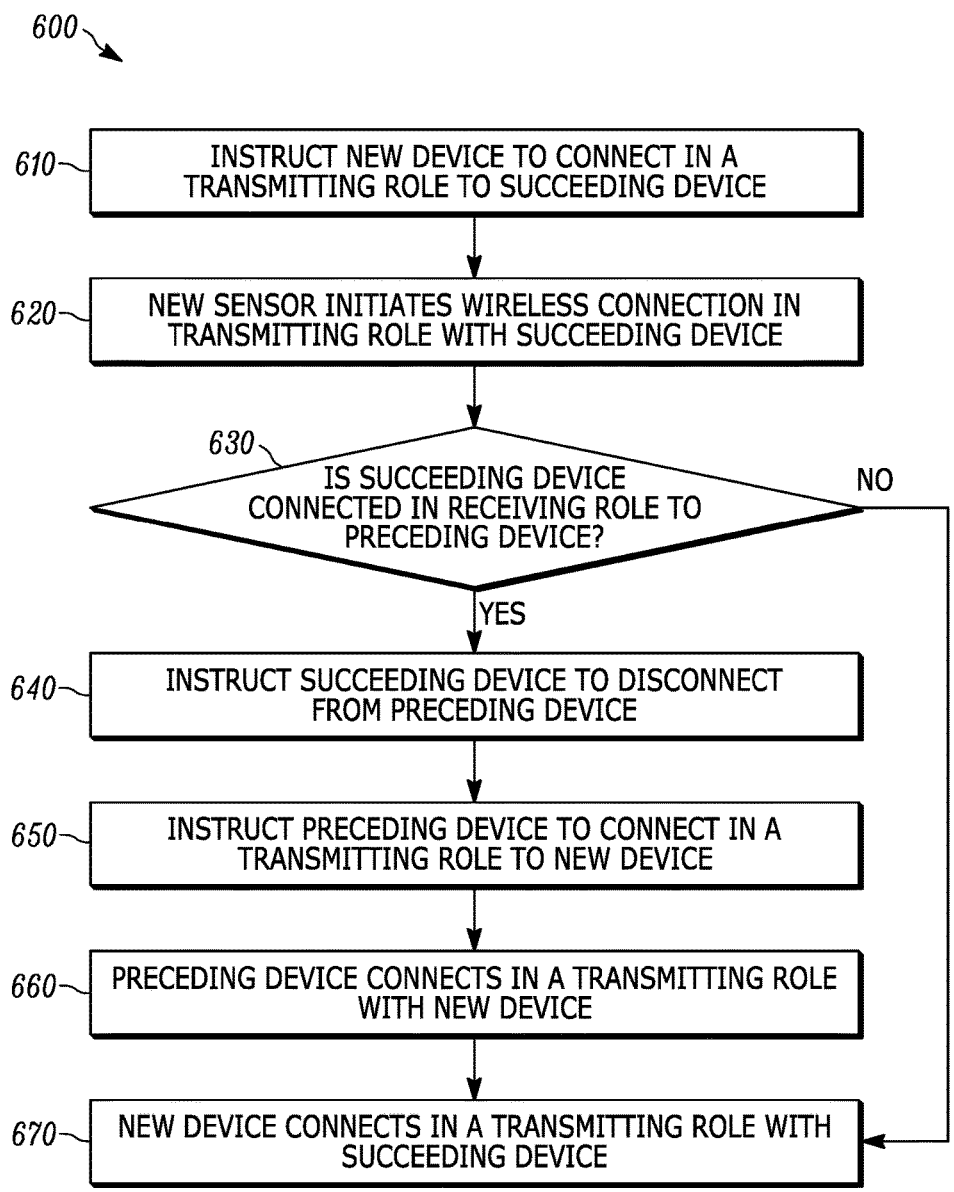
FIG. 6 is a flowchart of a method of inserting a new device in a sequential personal area network in accordance with some embodiments.

FIG. 6 is a flowchart illustrating one example method 600 of inserting a new sensor device 120D in the sequential personal area network chain 100. As described above with respect to FIG. 5, the mobile communications device 110 determines a position at which to insert the new sensor device 120D, for example, between the first sensor device 120A and the second sensor device 120B. The mobile communications device 110, using the electronic processor 210 via the transceiver 230, may instruct the new sensor device 120D to connect to the succeeding sensor device 120 (that is, the first sensor device 120A that succeeds from the determined position) in a transmitting role (at block 610). The mobile communications device 110 may transmit identification information of the succeeding sensor device 120 with the instruction to the new sensor device 120D. In some embodiments, the succeeding device from the determined position may be the mobile communications device 110, for example, when the mobile communications device 110 determines that the new sensor device 120D is to be inserted between the mobile communications device 110 and the first sensor device 120A. In these embodiments, the mobile communications device 110 instructs the new sensor device 120D to initiate a connection in a transmitting role with the mobile communications device 110.

The new sensor device 120D, using the sensor electronic processor 310 via the sensor transceiver 330, initiates a wireless connection in a transmitting role with the succeeding sensor device 120 (at block 620). Any known techniques may be used to initiate a wireless connection between the new sensor device 120D and the succeeding sensor device 120. For example, the new sensor device 120D may initiate pairing (for example, using Bluetooth® protocol) in a transmitting role with the succeeding sensor device 120. Similarly, in embodiments where the succeeding device is the mobile communications device 110, the new sensor device 120D may initiate pairing in a transmitting role with the mobile communications device 110.

The method 600 also includes determining whether the succeeding sensor device 120 is connected in a receiving role with a preceding sensor device 120 (at block 630). The mobile communications device 110 may determine the existing connections of the succeeding sensor device 120 by polling the succeeding sensor device 120. When mobile communications device 110 determines that the succeeding sensor device 120 is connected in a receiving role with a preceding sensor device 120, the mobile communications device 110 instructs the succeeding sensor device 120 to disconnect from the preceding sensor device 120 (at block 640). As described above, the mobile communications device 110 may instruct the succeeding sensor device 120 by transmitting a wireless signal with the instruction to the succeeding sensor device 120. That is, the mobile communications device 110 disrupts existing transmitting-receiving connections between one or two existing sensor devices 120 (for example, one or two existing devices or one or two existing sensors). In embodiments where the succeeding device is the mobile communications device 110, the mobile communications device 110 disconnects from the preceding sensor device 120.

The mobile communications device 110 also instructs the preceding sensor device 120 to connect (for example, a second connection) in a transmitting role with the new sensor device 120D (at block 650). The mobile communications device 110 may instruct the preceding sensor device 120 in a similar way as described with respect to block 610. The preceding sensor device 120 connects in a transmitting role with the new sensor device 120D (at block 660). As described above, the preceding sensor device 120 may pair (for example, using Bluetooth® protocol) in a transmitting role with the new sensor device 120D. That is, the mobile communications device 110 initiates transmitting-receiving connections between one or two existing sensor devices 120 (for example, one or two existing devices or one or two existing sensors) and the new sensor device 120D.

The new sensor device 120D connects in a transmitting role with the succeeding sensor device 120 (at block 670). When the mobile communications device 110 determines that the succeeding device is not connected in a receiving role to any device (that is, when the succeeding device is the last device in the sequential personal area network chain 100) (at block 630) or once the preceding sensor device 120 is connected in a transmitting role to the new sensor device 120D, the new sensor device 120D completes the connection in a transmitting role with the succeeding sensor device 120. That is, for example, the new sensor device 120D completes the pairing operation with the succeeding sensor device 120.

Figure 7:
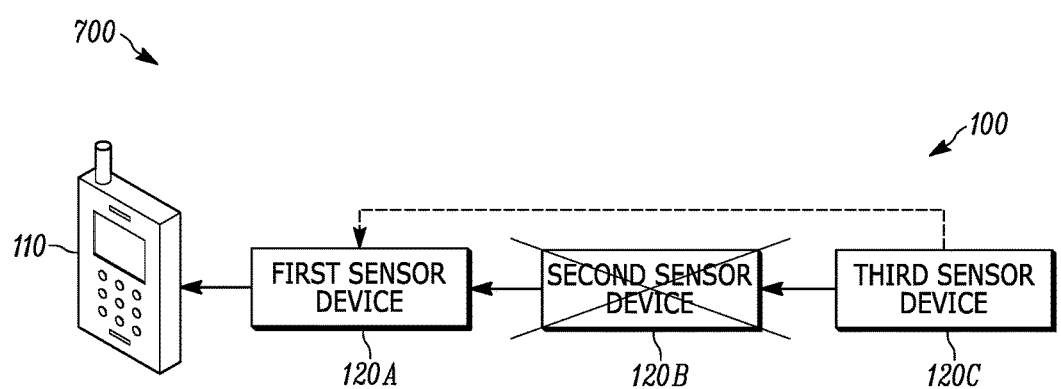
FIG. 7 is a diagram of a sequential personal area network chain including a disconnected device in accordance with some embodiments.

In some embodiments, once added to the sequential personal area network chain 100, a device may become disconnected, such as due to a power loss or other malfunction. For example, FIG. 7 is a diagram of a system 700 including the sequential personal area network chain 100 where the second sensor device 120B is disconnected. When the second sensor device 120B is disconnected, the mobile communication device 110 no longer receives data from both the second sensor device 120B and the third sensor device 120C. Accordingly, as explained in detail below with respect to FIG. 8, the mobile communications device 110 may repair the sequential personal area network chain 100 by removing the disconnected second sensor device 120B from the personal area network chain 100.

Figure 8:
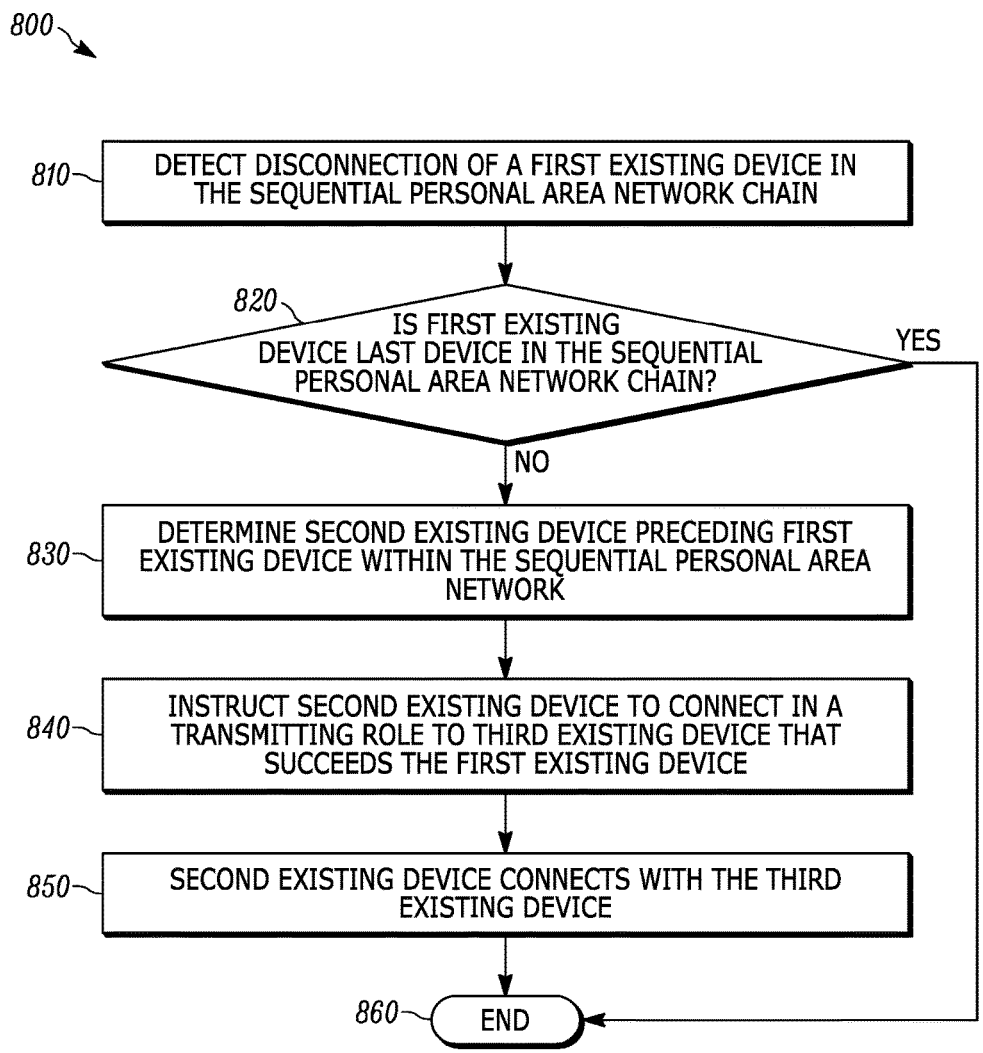
FIG. 8 is a flowchart of a method of repairing a sequential personal area network in accordance with some embodiments.

For example, FIG. 8 is a flowchart of an example method 800 of repairing a sequential personal area network chain. The method 800 includes the mobile communications device 110 detecting, using the electronic processor 210, disconnection of an existing sensor device 120 (for example, a first existing device or a first existing sensor) in a sequential personal area network chain (at block 810). As noted above, an existing sensor device 120 may disconnect, for example, due to low battery, device failure, and the like. The mobile communications device 110 may detect the disconnection based on the sensor data received (or the lack of receiving sensor data). For example, in the example shown in FIG. 7, the mobile communications device 110 may detect that the second sensor device 120B is disconnected when the mobile communications device 110 receives the sensor data from the first sensor device 120A and finds that the sensor data is missing information from the second sensor device 120B and the third sensor device 120C.

Returning to FIG. 8, the mobile communications device 110 determines, using the electronic processor 210, whether the disconnected existing sensor device 120 is the last device in the sequential personal area network chain (at block 820). That is, the mobile communications device 110 determines whether the disconnected existing sensor device 120 forms the second end of a sequential personal area network chain. When the disconnected existing sensor device 120 is the last device in a sequential personal area network chain, no adjustments are needed because, in this situation, no other sensor devices 120 rely on the disconnected sensor device 120 to relay data.

When the mobile communications device 110 determines that the disconnected existing sensor device 120 is not the last device in the sequential personal area network chain, the mobile communications device 110 determines another existing sensor device 120 (for example, a second existing device or a second existing sensor) preceding the disconnected existing sensor device 120 within the sequential personal area network chain (at block 830). For example, using the example illustrated in FIG. 7 when the second sensor device 120B is disconnected, the mobile communications device 110 determines that the third sensor device 120C precedes the second sensor device 120B within the sequential personal area network chain 100.

The mobile communications device 110 instructs the preceding existing sensor device 120 to initiate a connection in a transmitting role with an existing sensor device 120 (for example, a third existing device or a third existing sensor) that succeeds the disconnected existing sensor device 120 (at block 840). As explained above with respect to method 600, the mobile communications device 110 may transmit wireless signals to the preceding existing sensor device 120 with instructions and identification information of the succeeding existing sensor device 120 to connect to. For example, in the example illustrated in FIG. 7, when the second sensor device 120B is disconnected, the mobile communications device 110 instructs the third sensor device 120C to initiate a connection in a transmitting role with the first sensor device 120A.

The preceding existing sensor device 120 connects in a transmitting role with the succeeding existing sensor device 120 (at block 850). That is, the preceding existing sensor device 120 pairs with the succeeding existing sensor device 120. For example, in the example illustrated in FIG. 7, when the second sensor device 120B is disconnected, the third sensor device 120C connects in a transmitting role with the first sensor device 120A. When the preceding existing sensor device 120 is connected to the succeeding existing sensor device 120 or when the mobile communications device 110 determines that the disconnected existing sensor device 120 is the last device in the sequential personal area network chain, the method 800 ends (at block 850).

The methods 500, 600, and 800 are described above as being performed by the electronic processor 210 of the mobile communications device 110. However, in other embodiments, all or a portion of one or more of these methods may be performed by one of the sensor devices 100 or another target device (separate from the mobile communications device 110).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method of adding a device to a sequential personal area network chain, the method comprising:
   detecting, with an electronic processor, a new device to be added in the sequential personal area network chain;
   determining, with the electronic processor, an expected transmission interval for the new device;
   determining, with the electronic processor, a position at which to insert the new device within the sequential personal area network chain based on the expected transmission interval of the new device and a hierarchy of transmission intervals across two or more devices already in the sequential personal area network chain, the sequential personal area network chain including a target device at a first end of the sequential personal area network chain opposite a second end of the sequential personal area network chain, the position of the new device preceding the target device in the sequential personal area network chain in a direction from the second end to the first end; and
   causing, with the electronic processor, the new device to be inserted into the sequential personal area network chain at the determined position.

2. The method of claim 1, wherein detecting the new device includes detecting a beacon transmitted by the new device.

3. The method of claim 2, wherein determining the expected transmission interval of the new device includes determining the expected transmission interval based on the beacon.

4. The method of claim 2, wherein detecting the new device includes detecting a sensor.

5. The method of claim 1, wherein determining the position of the new device includes comparing the expected transmission interval of the new device to a second transmission interval of an existing device included in the sequential personal area network chain and identifying the existing device as succeeding the new device in the sequential personal area network chain in the direction from the second end to the first end when the expected transmission interval of the new device does not exceed the second transmission interval.

6. The method of claim 5, wherein determining the position of the new device includes comparing the expected transmission interval of the new device to a third transmission interval of a second existing device included in the sequential personal area network chain preceding the existing device, and identifying the second existing device as preceding the new device in the sequential personal area network chain in the direction from the second end to the first end when the expected transmission interval of the new device exceeds the third transmission interval and does not exceed the second transmission interval.

7. The method of claim 6, further comprising, when the existing device is connected to the second existing device in a transmitting role within the sequential personal area network chain, disconnecting the existing device from the second existing device and initiating a second connection of the existing device to the new device in the transmitting role within the sequential personal area network chain.

8. The method of claim 1, wherein causing the new device to be inserted into the sequential personal area network chain includes initiating a connection of the new device to the target device.

9. The method of claim 1, further comprising
   detecting a disconnection of a first existing device included in the sequential personal area network chain;
   determining a second existing device preceding the first existing device within the sequential personal area network chain; and
   initiating a second connection of the second existing device to a third existing device in a transmitting role within the sequential personal area network chain, the third existing device succeeding the first existing device within the sequential personal area network chain.

10. The method of claim 1, wherein the target device is a mobile communications device.

11. The method of claim 1, wherein the new device is one selected from a group consisting of a holster sensor, a blood pressure sensor, a temperature sensor, an orientation sensor, a movement sensor, and a gas sensor.

12. The method of claim 1, wherein causing the new device to be inserted into the sequential personal area network chain at the determined position further comprises initiating transmitting-receiving connections between one or two existing devices and the new device in the sequential personal area network chain.

13. The method of claim 1, wherein causing the new device to be inserted into the sequential personal area network chain at the determined position further comprises disrupting existing transmitting-receiving connections between one or two existing devices and the new device in the sequential personal area network chain.

14. A communications device comprising:
   an electronic processor configured to
      detect a new device to be added in a sequential personal area network chain, the sequential personal area network chain having a hierarchy of transmission intervals across two or more devices already in the sequential personal area network chain including the communications device at a first end of the sequential personal area network chain opposite a second end of the sequential personal area network chain;
      determine an expected transmission interval for the new device;

determine a position at which to insert the new device within the sequential personal area network chain based on the expected transmission interval of the new device and the hierarchy of transmission intervals across the two or more devices already in the sequential personal area network chain, the position of the new device preceding the communications device in the sequential personal area network chain in a direction from the second end to the first end; and cause the new device to be inserted into the sequential personal area network chain at the determined position.

15. The communications device of claim 14, wherein determining the position of the new device includes comparing the expected transmission interval of the new device to a second transmission interval of an existing device included in the sequential personal area network chain and identifying the existing device as preceding the new device in the sequential personal area network chain in the direction from the second end to the first end when the expected transmission interval of the new device does not exceed the second transmission interval.

16. The communications device of claim 15, wherein determining the position of the new device includes comparing the expected transmission interval of the new device to a third transmission interval of a second existing device included in the sequential personal area network chain succeeding the existing device, and identifying the second existing device as succeeding the new device in the sequential personal area network chain in the direction from the second end to the first end when the expected transmission interval of the new device exceeds the third transmission interval and does not exceed the second transmission interval.

17. The communications device of claim 14, wherein the electronic processor is further configured to:
   detect a disconnection of a first existing device included in the sequential personal area network chain;
   determine a second existing device preceding the first existing device within the sequential personal area network chain; and
   initiate a second connection of the second existing device to a third existing device in a transmitting role within the sequential personal area network chain, the third existing device succeeding the first existing device within the sequential personal area network chain.

18. A system for forming a sequential personal area network chain, the system comprising:
   a new sensor; and
   a target device communicating with the new sensor over a wireless personal area network and including an electronic processor, the electronic processor configured to
      detect the new sensor to be added in the sequential personal area network chain;
      determine an expected transmission interval for the new sensor;
      determine a position at which to insert the new sensor within the sequential personal area network chain based on the expected transmission interval of the new sensor and a hierarchy of transmission intervals across two or more sensors already in the sequential personal area network chain, the sequential personal area network chain including the target device at a first end of the sequential personal area network chain opposite a second end of the sequential personal area network chain, the position of the new sensor preceding the target device in the sequential personal area network chain in a direction from the second end to the first end; and
      cause the new sensor to be inserted into the sequential personal area network chain at the determined position.

19. The system of claim 18, wherein determining the position of the new sensor includes comparing the expected transmission interval of the new sensor to a second transmission interval of an existing sensor included in the sequential personal area network chain and identifying the existing sensor as preceding the new sensor in the sequential personal area network chain in the direction from the second end to the first end when the expected transmission interval of the new sensor does not exceed the second transmission interval.

20. The system of claim 19, wherein determining the position of the new sensor includes comparing the expected transmission interval of the new sensor to a third transmission interval of a second existing sensor included in the sequential personal area network chain succeeding the existing sensor, and identifying the second existing sensor as succeeding the new sensor in the sequential personal area network chain in the direction from the second end to the first end when the expected transmission interval of the new sensor exceeds the third transmission interval and does not exceed the second transmission interval.

* * * * *